United States Patent
Araki et al.

(10) Patent No.: US 10,344,201 B2
(45) Date of Patent: Jul. 9, 2019

(54) PROCESS FOR THE PRODUCTION OF NANOPARTICLES AND COMPOSITIONS

(71) Applicants: PETRÓLEO BRASILEIRO S.A.—PETROBRAS, Rio de Janeiro, RJ (BR); Universidade de São Paulo—USP, São Paulo, SP (BR)

(72) Inventors: Koiti Araki, Cotia (BR); Sergio Hiroshi Toma, São Paolo (BR); Delmárcio Gomes Da Silva, São Paolo (BR); Henrique Eisi Toma, São Paolo (BR); Rita de Cássia Comis Wagner, Rio de Janeiro (BR); Bernardo Coutinho Camilo Dos Santos, Rio de Janeiro (BR); Alex Tadeu de Almeida Waldmann, Rio de Janeiro (BR)

(73) Assignees: PETRÓLEO BRASILEIRO S.A.—PETROBRAS, Rio de Janeiro (BR); Universidade de Sao Paulo—USP, Sao Paulo (BR)

( * ) Notice: Subject to any disclaimer, the term of this patent is extended or adjusted under 35 U.S.C. 154(b) by 112 days.

(21) Appl. No.: 15/053,132

(22) Filed: Feb. 25, 2016

(65) Prior Publication Data
US 2016/0251561 A1 Sep. 1, 2016

(30) Foreign Application Priority Data
Feb. 26, 2015 (BR) ...................... 10 2015 004125-0

(51) Int. Cl.
*C01G 49/08* (2006.01)
*C09K 8/58* (2006.01)
*C09K 8/035* (2006.01)

(52) U.S. Cl.
CPC ............... *C09K 8/58* (2013.01); *C01G 49/08* (2013.01); *C09K 8/035* (2013.01); C01P 2002/88 (2013.01); C01P 2004/64 (2013.01); C01P 2006/42 (2013.01); C01P 2006/82 (2013.01); C09K 2208/10 (2013.01)

(58) Field of Classification Search
CPC ...... C09K 8/58; C09K 2208/10; C01G 49/08; C01P 2004/64; C01P 2006/42; B82Y 30/00; B82Y 40/00
See application file for complete search history.

(56) References Cited

U.S. PATENT DOCUMENTS

| 5,589,442 A * | 12/1996 | Gee ........................... C09K 8/26 507/103 |
| 5,877,995 A | 3/1999 | Thompson et al. |
| 2006/0133990 A1* | 6/2006 | Hyeon ...................... B22F 9/30 423/622 |

(Continued)

FOREIGN PATENT DOCUMENTS

| BR | 0302329 A | 10/2005 |
| BR | 1103181 A2 | 8/2013 |

(Continued)

*Primary Examiner* — Aiqun Li
(74) *Attorney, Agent, or Firm* — Sughrue Mion, PLLC

(57) ABSTRACT

This invention describes the development of technology for the preparation of superparamagnetic lipophilic nanofluids, as well as of drilling fluid additives based on the aforementioned nanofluids, which improve the properties which form walls or mud filter cakes and concomitantly act as contrast agents in RMN logging.

7 Claims, 7 Drawing Sheets

(56) References Cited

U.S. PATENT DOCUMENTS

| | | | |
|---|---|---|---|
| 2010/0189901 A1* | 7/2010 | Chung | B22F 9/24 |
| | | | 427/256 |
| 2011/0232940 A1* | 9/2011 | Hwang | C10M 111/02 |
| | | | 174/17 LF |
| 2013/0091941 A1 | 4/2013 | Huh et al. | |

FOREIGN PATENT DOCUMENTS

| | | |
|---|---|---|
| CN | 102329600 A | 1/2012 |
| WO | 2013/192629 A1 | 12/2013 |

* cited by examiner

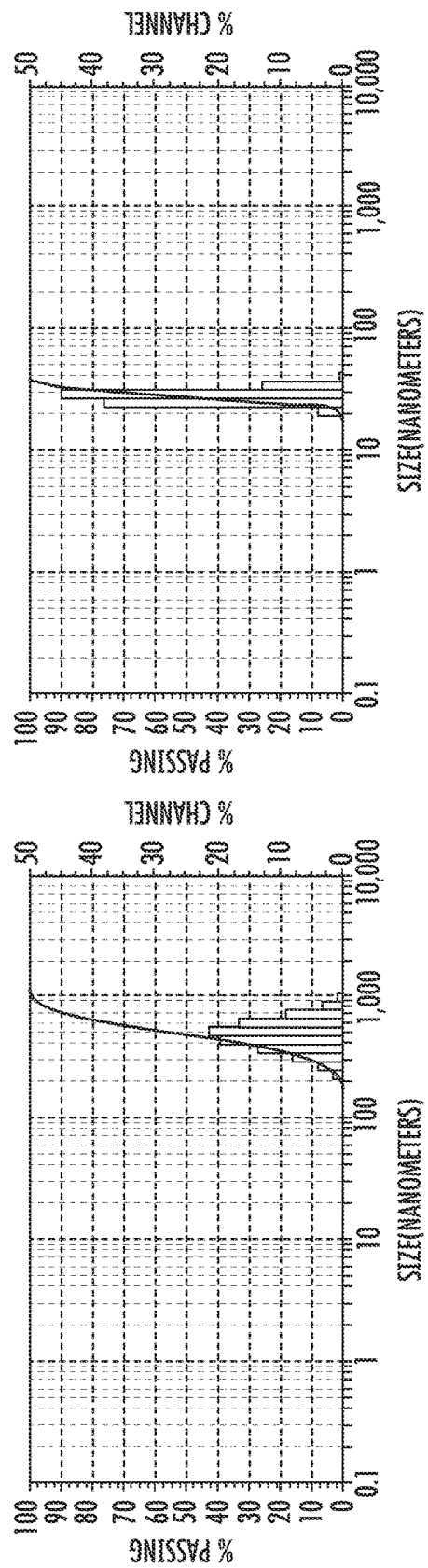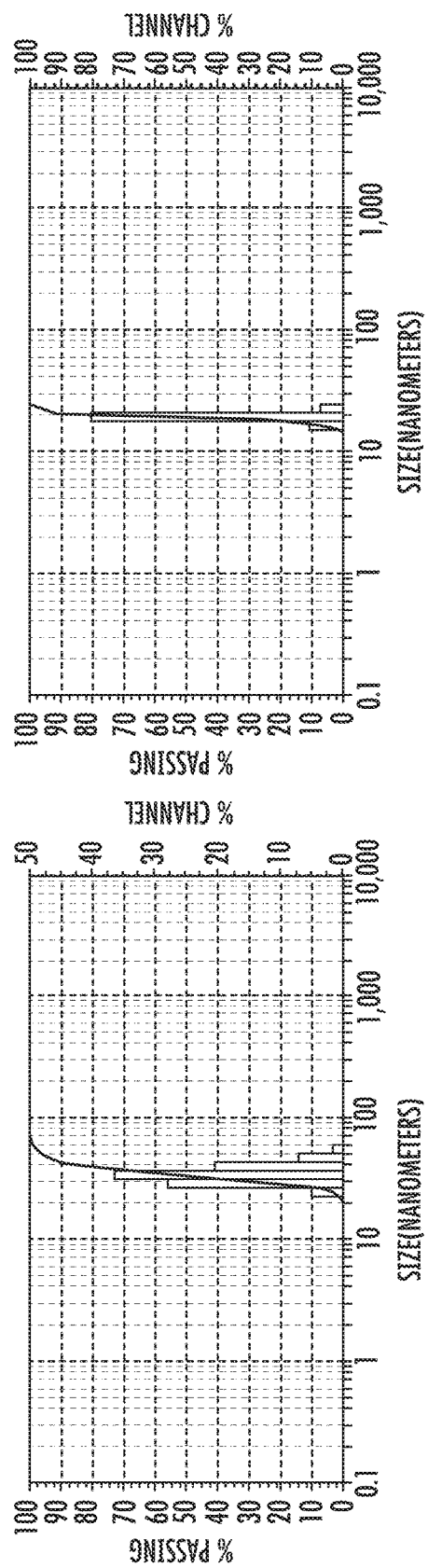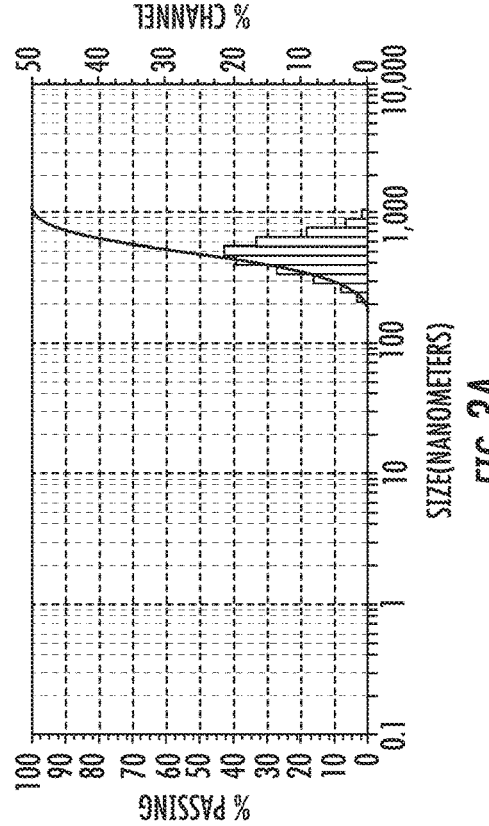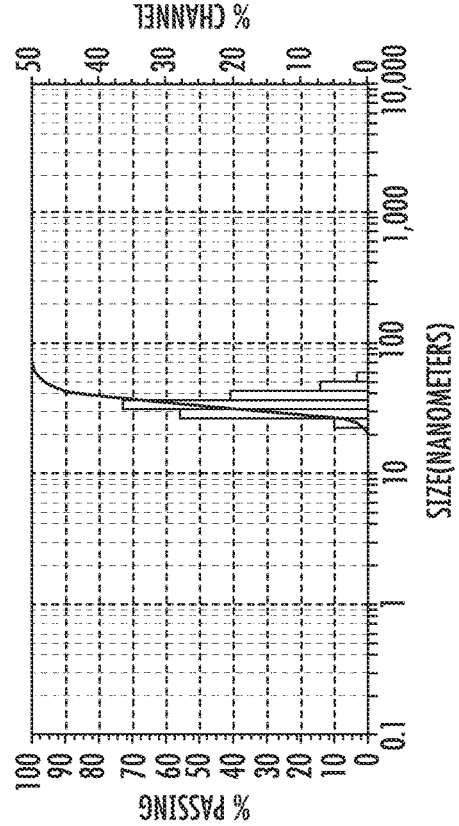

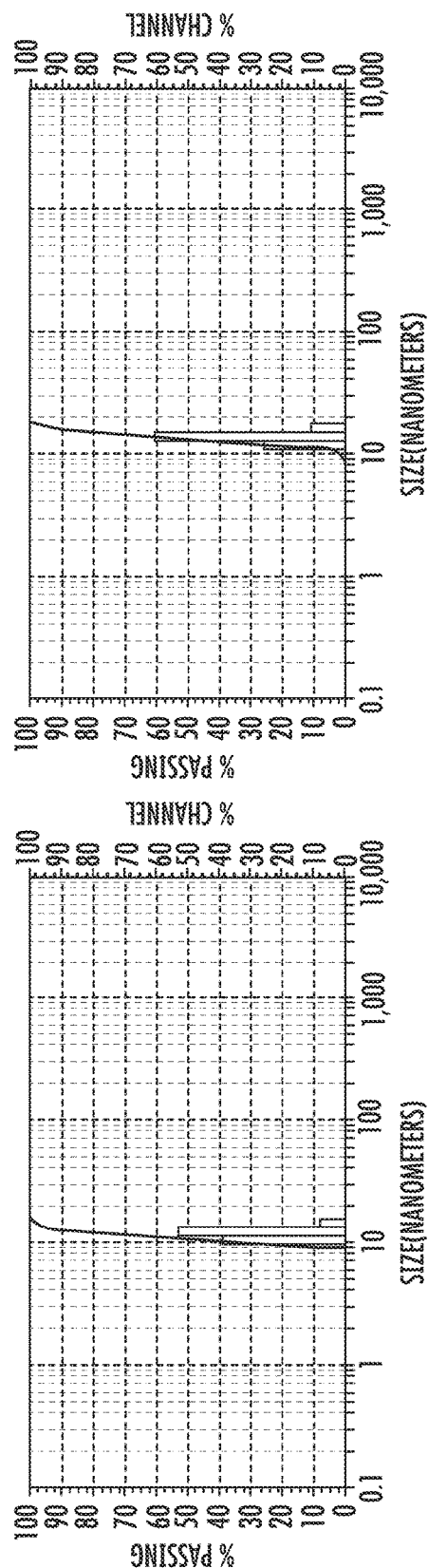
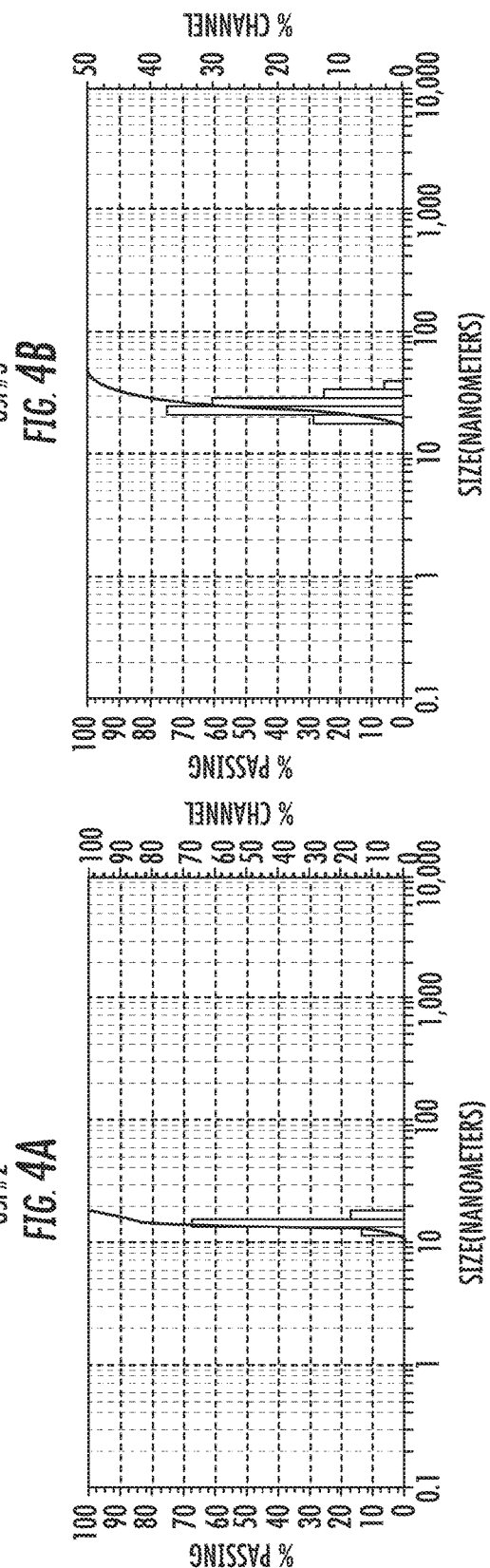
FIG. 4A  USP#2
FIG. 4B  USP#3
FIG. 4C  USP#4
FIG. 4D  USP#5

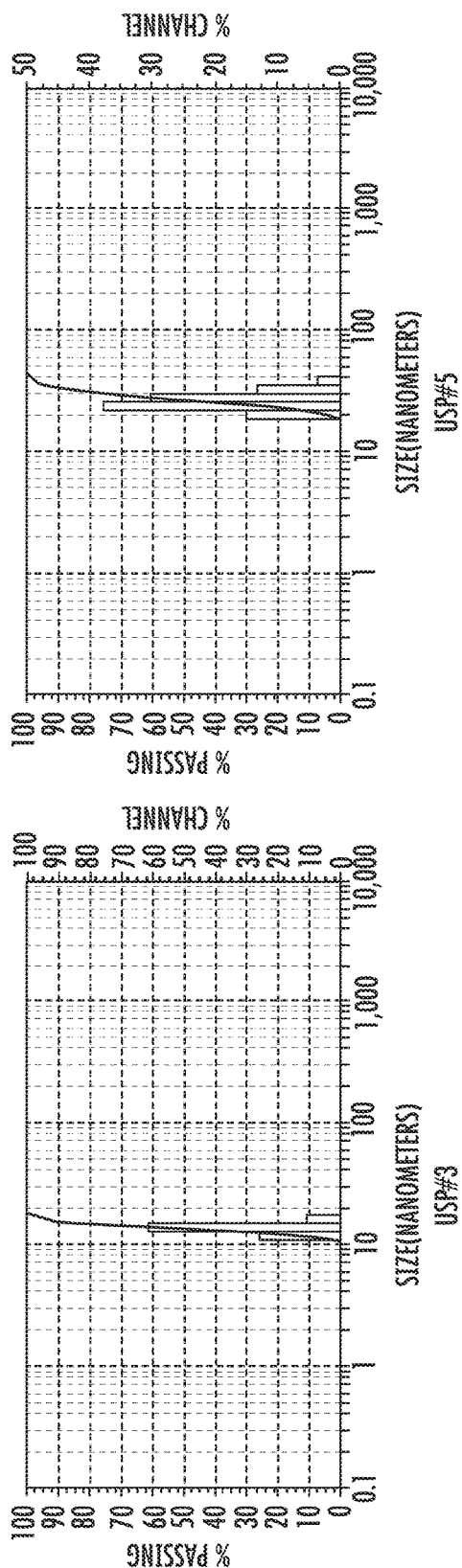
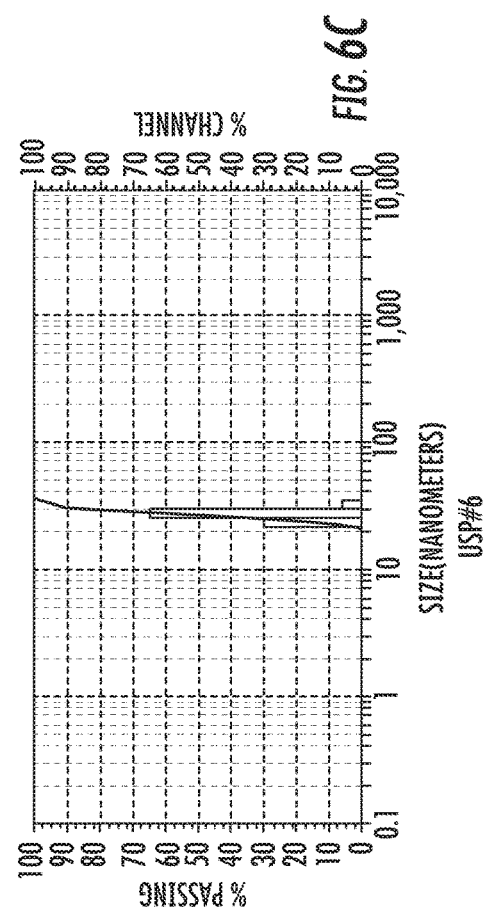
FIG. 6A
FIG. 6B
FIG. 6C

PROCESS FOR THE PRODUCTION OF NANOPARTICLES AND COMPOSITIONS

INVENTION FIELD

This invention is about processes for the preparation of nanoparticles which can be incorporated into superparamagnetic lipophilic fluids; as well as compositions containing the aforementioned nanoparticles for use as additives in drilling fluids.

DESCRIPTION OF STATE OF ART

One of the problems that needs to be faced to define strategies for oil reservoir exploration is the difficulty in determining the reservoir rock permeability characteristics, above all concerning the power and fissure distribution.

Magnetite nanoparticles dispersed in oil or water (magnetic nanofluids) can be used as nanoprobes in order to determine rock permeability in displacement tests in porous medium, thus generating valuable data for well development. Such data are added to those obtained through indirect imaging such as the microseismic method which explores density and acoustic reflectivity differences with the purpose of mapping the reservoir rock.

Some probing methods of the oil and/or water phase, such as RMN (Ressonância Magnética Nuclear [Nuclear Magnetic Resonance]) or chemical markers present limitations and low reliability due to the gigantic volume of the reservoirs. In the case of the RMN probing, scanning is restricted to a depth of just some centimeters, while the information obtained by chemical markers through their injection into the producing well and their later retrieval is hard to interpret due to the lack of information about pore distribution and lack of homogeneity of the permeability properties of the reservoirs.

The use of superparamagnetic nanoparticles as probes in EOR (Enhanced Oil Recovery) processes is interesting for this purpose, employing concepts similar to the imaging or Magnetic Resonance Imaging (MRI), in order to map the distribution of oil and water in reservoirs.

One of the strategies is to direct the magnetic nanoparticles towards the oil-water interface or disperse them in one of the phases in the reservoir rock pores and then expose them to an external magnetic field. The movement of one of the fluids or its interface in response to the oscillating magnetic field generates pressure waves (acoustic waves) which can be measured through sufficiently sensitive geophones.

The U.S. Pat. No. 5,877,995, for instance, described a hydrocarbon analysis method based on the monitoring of the seismic response resulting from the application of an electromagnetic field as a function of the dielectric constant difference between water and oil phases.

Another known strategy is the use of superparamagnetic nanoparticles as diffusion probes and contrast agents in an MRI based in the interactions between them and the medium (water or oil), thus promoting spin relaxation mechanisms for certain nuclei in the fluid medium, mainly of the proton, which displaces the resonance frequencies and makes it possible to collect data faster.

Therefore the purpose is that the superparamagnetic nanoparticles promote a significant increase of contrast and sensitivity around the nanoparticles, or on the water/oil interface inside the reservoir rock. Such concepts are already being used, by applying paramagnetic compounds and superparamagnetic iron oxide nanoparticles (SPIONs), as contrast agents in clinical analysis through the imaging technique by nuclear magnetic resonance (MRI). This same concept may still be extended to the several phases of production of the oil since its incorporation in drilling fluids for failure mapping or processes which lead to fluid loss, or as contrast agents during the cementing process, making it possible to follow or monitor it.

However, the nanoparticles and nanomaterials which have been used in tests are currently being exclusively produced in laboratories, through complex and laborious methods, which restricts the nanofluid production volume, in general, from some hundred milliliters to some liters. Therefore, stable superparamagnetic nanofluid production processes, either hydrophilic and/or lipophilic, dispersible and large scale, with efficiency and cost-effective, are of great interest for current market applications.

Due to this fact, several studies are currently under way to solve the aforementioned problems.

Patent application number US20130091941 describes a method for the detection of the presence and distribution of oil in an underground rock formation which involves the injection of an aqueous nanoparticle dispersion into a formation below the surface which may contain oil, followed by the remote detection of the oscillation responses by the nanoparticles on the oil/water interface in the reservoir rock through the application of a magnetic field.

The document WO2013192629 refers to magnetic nanoparticles used to magnetically detect hydrocarbons in a geologic structure. Magnetic nanoparticles may include a nuclear particle and a temperature-sensitive polymer selected from the group which consists of polyacrylamides, polyethylene-glycols and their combinations associated to the nuclear particle. Plus, methods are described for the detection of hydrocarbons in a geologic structure through magnetic nanoparticles.

The Chinese document CN102329600 is about using nanoparticles to seal channels in oil wells. The water sealing agent is used to bind microfissures and low permeability strata.

The Brazilian document BR0302329 details a superparamagnetic nanomaterial composed of magnetite, organosilane polymer and extracting agent. In addition to that, it describes a process to obtain it. Magnetite particles are at a nanometric scale to present the superparamagnetic property. Nanoparticles in this superparamagnetic material have functional groups with great affinity for the trivalent, tetravalent and hexavalent ions, and can be used to remove toxic metal pollutants in industrial and radioactive waste.

Brazilian document BR1103181 refers to a process of preparation of superparamagnetic nanoparticle preparation process from ion oxide lipophylic magnetic nano-ferrofluids and the use of those superparamagnetic nanoparticles as demulsifying agent to be applied mainly in liquid areas impacted by oil spills.

U.S. document U.S. Pat. No. 5,877,995 refers to a method and a geophysical survey apparatus. The method applies an electric field to the underground porous formation which contain fluid to create a fluid pulse from polarization changes in pore fluid dipoles. Fluid pulse propagates underground as a seismic wave which can be detected by an adequate seismic detector array.

Therefore, the technique still requires a process for the preparation of nanoparticles with superparamagnetic properties which are adequate for several uses as drilling additive, magnetic fluid component and contrast agent.

SUMMARY OF THE INVENTION

This invention consists of a process for the production of superparamagnetic nanoparticles from the synthesis of a precursor through the reaction of at least one preferentially aliphatic carboxylate with at least one transition metal ion selected from the group consisting of Fe(III), Co(III), Mn(III), Cr(III), Ni(II), Cu(II) and Zn(II) in aqueous medium.

Nanoparticles thus obtained may be used in compositions combined with at least one standard synthetic fluid, so that they work as a filling agent.

BRIEF DESCRIPTION OF THE DRAWINGS

This invention shall be described here in greater detail by referring to the attached drawings, in which:

FIG. 6 shows size distribution histograms obtained by DLS of the USP#3, USP#5 and USP#6;

DETAILED DESCRIPTION OF THE INVENTION

Figure 1:
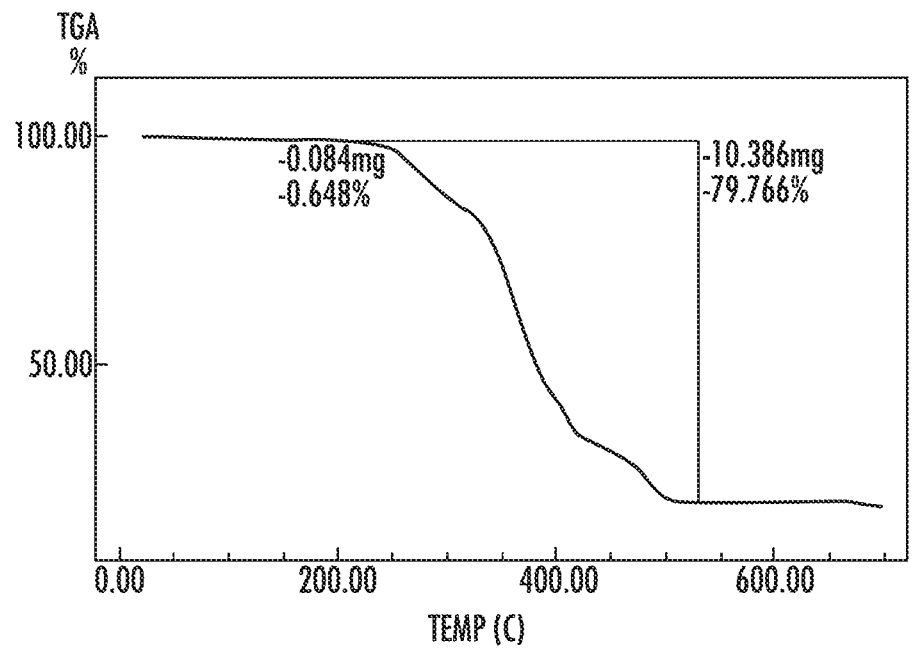
FIG. 1 shows a thermogravimetric analysis of Precursor [Fe(est)3], done in a synthetic air atmosphere, at a heating rate of 10° C./min, in the 25-700° C. temperature range.

This invention describes a process to prepare superparamagnetic nanoparticles to be used in lipophilic fluids.

This process involves obtaining precursors (intermediate compounds), carboxylates, preferentially long-chain aliphatic carboxylates, with, more preferentially, transition metal halide ions, selected from: Fe(III), Co(III), Mn(III), Cr(III), Ni(II), Cu(II) and Zn(II). The process involves the induced precipitation/agglomeration of precursors (intermediate compounds) through adding aliphatic organic solvents, and makes it possible to perform the separation of the aqueous phase, containing the salts formed in neutralization or exchange reactions, or in an easier or quicker way, by decantation, siphoning or filtration, which allows them to be made in a cost-effective way when compared to the conventional processes. In conventional processes they are made and purified through extraction followed by solvent distillation, which leads to the formation of emulsions which are hard to break.

Therefore, this invention refers to a process to make nanoparticles, which comprises the following steps:

a) Prepare a precursor from a reaction of at least one carboxylate, preferentially aliphatic, with at least one transition metal ion, selected from the group consisting of Fe(III), Co(III), Mn(III), Cr(III), Ni(II), Cu(II) and Zn(II) in aqueous medium;

b) Under reflux, add to the precursor of the step a) a high boiling point oil phase from 180 to 310° C., and at least one reducing agent.

In the preferred embodiment of the process of this invention, step a) of the aforementioned process comprises the following steps:

a.i. Heating the water used in a reaction medium at 70 to 100° C.;

a.ii Adding carboxylate, preferentially saturated and aliphatic, under agitation;

a.iii Adding the transition metal ion, which preferentially should be iron halide; and a.iv Adding toluene under agitation.

Preferentially, the reducing agent is selected from the group consisting of triethanolamine, triethylamine, ethanolamine, ethanolamine, hexadecylamine, stearic alcohol, citric acid, saccharose or a mix of these compounds. The most preferred reducing agent is triethanolamine.

In a preferred embodiment, the precursor and the reducing agent are present in the process at a molar ratio varying between 0.5 and 1.5. Most preferentially, the precursor and the reducing agent are present in the process at a molar ratio varying between 1.0 and 1.5.

Preferentially, the reflux applied in step b) of the process of this invention occurs at a temperature varying between 180 and 310° C., more preferably between 250 and 300° C.

Preferentially, the oil phase added in step b) of the process which is the object of this invention comprises: paraffin, octadecene, biodiesel derived from vegetable or animal oil or yet mixes of these compounds.

In a preferential embodiment of the process of this invention, the aliphatic carboxylate is sodium stearate and the transition metal halide is an iron halide, preferentially iron chloride.

Optionally in preferred embodiments of this invention, the process comprises yet one additional step of purification of the resulting nanoparticles which includes at least:

e.i Washing them with ethanol;

e.ii Filtration and e.iii Extraction to toluene.

In general, therefore, nanoparticles resulting from this invention present lipophilic superparamagnetic characteristics. They are prepared from a precursor (intermediate compound) which is itself synthesized from a reaction of at least one aliphatic carboxylate, preferentially saturated, and preferentially alquilic, with at least one transition metal halide, selected from the group consisting of Fe(III), Co(III), Mn(III), Cr(III), Ni(II), Cu(II) and Zn(II) among others, in aqueous medium.

In a preferred embodiment, the nanoparticles are composed of magnetite ($Fe_3O_4$).

Due to the characteristics of the desired nanomaterials, such as high crystallinity, stability, controlled size and dispersibility, the thermal decomposition phase is adequate for the development of the process due to its favorable characteristics.

Magnetite nanoparticles which are prepared by following the process described in this invention have an average diameter between 5 and 15 nm [nanometers] and improve by around 10 times the wall formation properties when used in drilling fluids (0.3 to 0.6% m/v), when compared to the conventional fluids which do not contain additives, thus reducing significantly the loss of fluid during the drilling process.

Magnetite nanoparticles made this way can be easily dispersed in organic solvents such as toluene or cyclohexane, forming magnetic fluids. This characteristic is crucial, because solid nanoparticles tend to be difficult to disperse, which shows the high quality of the nanomaterial resulting from the process described herein. In addition to that, those nanoparticles are virtually monodispersed, with an average size below 20 nm and high magnetization (over 40 emu/g [unit of mass magnetization]), thus demonstrating also a high level of crystallinity and purity. Such characteristics are important for oil exploration applications, and their excellent properties as drilling fluid additive, particularly in reducing filtration, and contrast agent for electromagnetic analysis have been proven.

On the other hand, the superparamagnetic properties of the magnetite nanoparticles allow us to obtain information about the permeability and filter-cake formation, as well as to map well profiles by using the RMN logging technique (contrast agents).

This invention also refers to the preparation of compositions comprising nanoparticles obtained through the aforementioned process combined with a standard synthetic fluid. In this case, such compositions can be used as filling agent especially during the rock drilling phase.

Such nanoparticles can also be used as dispersions in an oil or aqueous phase. In this case, such dispersions can be used as drilling fluids, in which nanoparticles work as an additive.

This invention also refers to the use of the nanoparticle obtained from the aforementioned process as a contrast agent in RMN logging.

The examples provided here have the sole purpose of exemplifying one of the countless ways to implement the invention, however without limiting its scope.

EXAMPLES

Example 1) Preparation of $Fe_3O_4$ Nanoparticles

Generally speaking, the thermal decomposition method involves the reaction of an iron(III) salt solubilized in a high boiling point solvent (>200° C.) in the presence of a diol and surfactants. Iron precursor is generally a metal-organic complex (e.g. Iron (III) Acethylacetonate-[Fe(Acac)3]) of which the main characteristic is the good solubility in the chosen solvent. It has been found that one of the limitations for the development of the method for the production in a large scale is the lack of suppliers and the high cost of this precursor. It has also been verified that the organic portion of the complex is not used in the synthesis of the nanoparticles, and it is wasted in the process. Therefore, this invention has as one of its objectives to generate iron salts of the $[Fe(grax)_3]$ type, where "grax" is the conjugate anionic base of a fatty acid, and use them as precursors when preparing lipophilic nanoparticles stabilized by those conjugate bases. Preferentially, the ($H_3C$—$(CH_2)_{16}$—$COO^-$) stearate ions and ($H_3C(CH_2)7CH$=$CH(CH_2)7COO^-$) oleate ions were chosen to prepare $[Fe(est)_3]$ and $[Fe(oleic)_3]$ precursors, respectively. Therefore, the global manufacturing process of the magnetite nanoparticles and their magnetic fluids could be divided into the three steps listed below:
1) Precursor preparation;
2) Thermal decomposition; and
3) Purification.

Those steps are described below.

1.1) Precursor Preparation

Iron (III) precursors were prepared through the double replacement reaction of iron chloride ($FeCl_3$) with sodium stearate (Na(est)), both industrial grade. Iron chloride was provided in a 18.8% (Fe content) solution or in the form of salt hexahydrate ($FeCl_3.6H_2O$).

Basically, the process consists of the dissolution of sodium stearate in a minimum water volume, under slow agitation and temperature close to boiling, which varies between 85 and 95° C., followed by cooling varying between 55 and 65° C. and the addition of an iron chloride solution, which leads to complex precipitation [Fe(est)$_3$]. The mixture is cooled down to a temperature between 20 and 30° C., and the precursor is separated through filtration on filter paper (180 g m$^{-2}$), washed with some water and dried in an oven. Table 1 below shows the amounts of reagents used and the yielded amount of resulting precursor [Fe(est)$_3$]. The precursor synthesis process was repeated several times varying those parameters so the best procedure is established and sufficient material is gathered for the thermal decomposition tests in the pre-pilot phase. At the end of all of them the resulting material was gathered in just one container, a total of approximately 9 Kg of precursor.

TABLE 1

| Na(est) (g) | FeCl$_3$•6H$_2$O (g) | Vol. H$_2$O(l) | Fe(est)$_3$ (g) | Yield (%) |
|---|---|---|---|---|
| 50.00 | 14.50 | 1.00 | 47.55 | 97.9 |
| 400.00 | 116.00 | 5.00 | 367.30 | 94.5 |
| 304.00 | 87.20 | 3.50 | 287.00 | 98.2 |
| 301.30 | 87.10 | 3.00 | 279.00 | 95.6 |
| 300.40 | 87.00 | 3.00 | 277.00 | 95.0 |
| 301.90 | 87.80 | 3.00 | 286.00 | 97.2 |
| 1204.70 | 349.50 | 13.00 | 1167.00 | 99.7 |
| 600.50 | 174.40 | 7.00 | 578.00 | 98.9 |
| 1201.00 | 348.30 | 14.00 | 1105.00 | 94.7 |
| 1202.70 | 348.65 | 14.00 | 1145.00 | 98.0 |
| 600.54 | 174.22 | 7.00 | 552.00 | 94.6 |
| 300.10 | 87.10 | 3.50 | 274.00 | 93.9 |
| 1200.40 | 348.55 | 14.00 | 1181.00 | 101.1 |
| 900.90 | 261.40 | 10.50 | 859.00 | 98.1 |
| 900.75 | 261.52 | 10.50 | 843.00 | 96.2 |
| | | | ~9000.00 | 97.2 ± 2.2 |

The result of the thermogravimetric analysis (TGA) of the precursor is illustrated in FIG. 1. The 0.65% mass loss which occurred at a 150° C. temperature was ascribed to the presence of residual water in the sample. The sudden mass reduction which happened after 150° C. results from combustion of the organic part, which leads to a 79.8% reduction in relation to the initial mass. This mass loss value is consistent with the transformation of the precursor to $Fe_2O_3$, for which the expected mass variation percentage is 82.3%. Water content in the precursor has also been measured through the Karl Fischer method and found to be of 0.54%, in accordance with the result obtained by using TGA.

1.2) Thermal Decomposition

Thermal decomposition tests of the iron precursor were carried out in two steps: the first one was the optimization of the conditions and parameters. After the definition of the reaction conditions for the 250 ml reactor, tests were carried out by gradually increasing the scale to 1, 3 and 6 liters, with the purpose of collecting data and adjusting the parameters to perform the pilot test.

A route of preparation of magnetic nanoparticles using BDT (treated biodiesel) as high boiling point solvent was developed in the laboratory. This method involves the preparation of the iron precursor of [Fe(oleic)$_3$] followed by the step in which thermal decomposition in BDT at 310° C., for 30-45 minutes is carried out. Nanoparticles were isolated by precipitation by the addition of ethanol and centrifugation.

Figure 2:
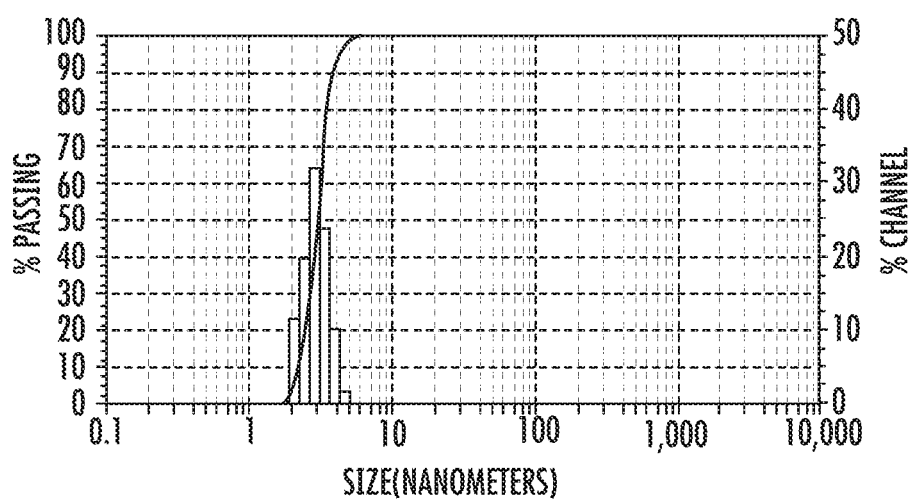
FIG. 2 shows a nanoparticle average size histogram obtained by DLS [Dynamic Light Scattering]

According to this method, the iron (III) oleate was synthesized by reacting technical grade sodium oleate (82% pure) and iron chloride for 4 hours, in a mixture of hexane:ethanol:water 7:4:3 (v/v) [volume/volume], at a temperature of 70° C. Castor bean biodiesel, previously treated with sodium hydroxide tablets (BDT), was used as a solvent in the thermal decomposition method. The reaction was performed by refluxing the freshly prepared iron oleate at a temperature of 310° C. for a period of 30-45 minutes in BDT, leading to the obtention of a magnetic nanofluid, as shown in FIG. 2. Dynamic light scattering analysis (DLS) revealed the presence of nanoparticles with an average diameter of 3 nm.

According to the procedure proposed in this example, 4.36 g of commercial sodium oleate (Sigma-Aldrich ≥82%) were reacted with 1.08 g iron chloride hexahydrate (Sigma-Aldrich 98%) in 8.0 ml of ethanol anhydro (Synth), 6.0 ml deionized water, and 14.0 ml n-hexane (Synth). The product (iron oleate) was washed three times with 3.0 ml of deionized water and then dried under vacuum in a rotary evaporator. After that, 3.6 g of the iron oleate and 0.57 g of oleic acid (Sigma-Aldrich 90%) were dissolved in 20.0 g of BDB [Bio Diesel Blend] and heated at a rate of 3.3° C. per minute until they reached a temperature varying between 250 and 310° C., at which they remained for 30-60 minutes. After cooling down at room temperature, the presence of magnetic material was verified by putting a magnet close to it. Then the magnetic nanoparticle purification and isolation step started. Variations of this method using $[Fe(est)_3]$ as an iron precursor were also carried out.

In the thermal decomposition method, in addition to the high boiling point solvent, surfactants and diols are used. But the role of the 1,2-hexadecanodiol in nanoparticle synthesis is not discussed in the state of the art.

The 1,2-hexadecanodiol can be used as reducing agent and oxygen donor. On the other hand the diol did not need to be used in the thermal decomposition processes using biodiesel as a solvent. From this analysis, it is possible to infer that the fatty portion of the BDT (castor beans) plays the role of the diol in the synthesis, possibly because of the action of the ricinoleate group (85-95%) or the dihydrostearic group (0.3 a 0.5%).

Figure 3E:
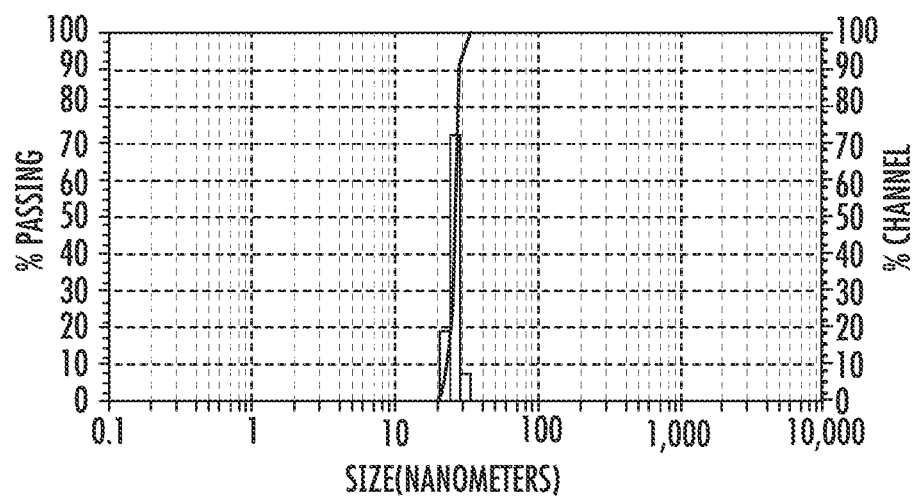
FIG. 3 shows size distribution histograms obtained by DLS of the samples from the tests listed in table 2.

Therefore, several thermal reducing species were evaluated, with adequate characteristics such as temperature and solubility in biodiesel, in addition to meeting the operating criteria of industrial availability and cost, in order to optimize the process and find a substitute for the 1,2-hexadecanodiol. The compounds triethanolamine, triethylamine, ethanolamine, triethanolamine, hexadecylamine, stearic alcohol, citric acid, glucose and saccharose were evaluated, among others. Among them, the triethanolamine $(N(CH_2CH_2OH)_3)$ was the one that presented the best results, so the evaluation of technical feasibility and determination of the reaction conditions were performed with this reagent as reducing agent, and the results are shown in Table 2. The best yield, with the smallest size, and smallest size dispersion were obtained by using a precursor/triethanolamine respective molar proportion of 1.2 and a temperature of 250° C., for 30 minutes. Histograms of particle sizes measured by DLS, of the products obtained in the tests described in Table 2 are shown in FIG. 3.

TABLE 2

| | Precursor Mass (g) | Triethanolamine Mass (g) | BDB [Biodiesel Blend] Mass (g) | Temp. (° C.) | Time (min) |
|---|---|---|---|---|---|
| 1 | 3.60 | 0.25 | 25.00 | 280 | 60 |
| 2 | 3.60 | 0.50 | 25.00 | 280 | 120 |
| 3 | 3.60 | 0.50 | 15.00 | 280 | 30 |
| 4 | 3.60 | 0.50 | 15.00 | 280 | 45 |
| 5 | 90.6 | 40 | 300 | 310 | 60 |
| 6 | 90.6 | 12.5 | 300 | 250 | 30 |
| 7 | 90.6 | 7.50 | 300 | 250 | 30 |

TABLE 2-continued

| | Proportion molar Prec./triet. | Evaluation of product magnetization | Yield (g) | DLS (nm) |
|---|---|---|---|---|
| 1 | 2.5 | Not very magnetic | — | — |
| 2 | 1.2 | Magnetic | 0.5 | 500 |
| 3 | 1.2 | Magnetic | 2 | 26 |
| 4 | 1.2 | Magnetic | 1.4 | 33 |
| 5 | 0.4 | Not Magnetic | — | — |
| 6 | 1.2 | Magnetic | 5.2 | 20 |
| 7 | 2.0 | Not very magnetic | — | 27 |

Therefore, with the addition of the reagent triethanolamine in a 1:1 proportion in relation to the iron precursor, high-yield excellent quality magnetic nanoparticles were obtained (monodisperse) and in a reproducible way in the reactions of thermal decomposition in BDB. Variations in the size or reduction of the quantity of triethanolamine in relation to the metallic precursor reduces the yield, and in extreme cases did not lead to forming nanoparticles or any magnetic material.

1.3) Purification

As a part of the development of the process in this invention aiming at producing high quality, high purity level magnetite nanoparticles and magnetic nanofluids the magnetite nanoparticles produced through the thermal decomposition process were isolated and purified through precipitation, filtration and successive washing with ethanol. Initially the reaction mixture without treatment, obtained by the thermal decomposition process, was cooled down until a 70-80° C. temperature, followed by the addition of an ethanol volume equivalent to 0.5 times the biodiesel volume used in the synthesis. The precipitate material was immediately filtered by a Büchner funnel through a thin layer of Celite. The precipitate was washed with toluene and then extracted with toluene heated up to 80° C., and strained through the Celite filter. The nanoparticle dispersion in toluene was transferred to a beaker, and the nanoparticles were precipitated with ethanol, as a fine precipitate. Magnetic material was then decanted by the action of a magnetic plate field (permanent magnets) positioned below the beaker and the supernatant was discarded. The solid was washed two or three other times with ethanol and then dried in an oven. The resulting product is easily redispersable in toluene, biodiesel and other similar solvents.

1.4) Pre-Pilot Tests

The tests (pre-pilot) for the development of the process of production of the organophilic magnetite superparamagnetic nanoparticles of the present invention were carried out with the purpose of verifying the behavior of the process as developed in scale-up conditions, especially using reactors with sizes compatible with industrial production.

The operating parameters of the process were obtained in 6 tests of the thermal decomposition process carried out in reactors (balloons) of 2, 3 and 6 liters, which confirmed that the method is robust and the process parameters raised are valid. The tests were performed by using the precursor $[Fe(est)_3]$ prepared in the Instituto de Química da Universidade de São Paulo [São Paulo University Chemistry Institute], as described above, and the parameters and main results were listed in Table 3 below.

Figure 4E:
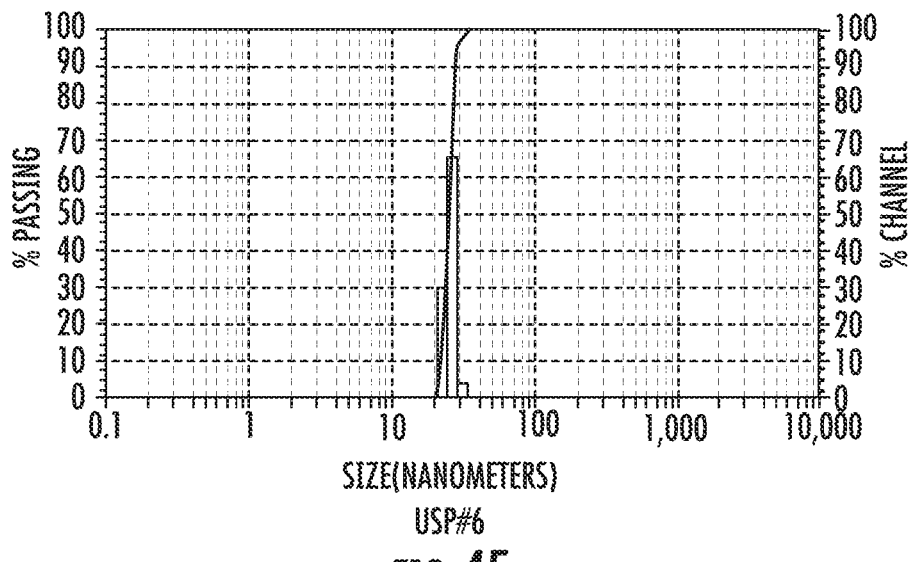
FIG. 4 shows magnetite nanoparticle size distribution histograms obtained by DLS from the samples listed in table 3.

The DLS results for the corresponding samples are shown in FIG. 4, which conveys the excellent reproducibility and low size dispersion of the magnetite nanoparticles obtained.

Figure 5:
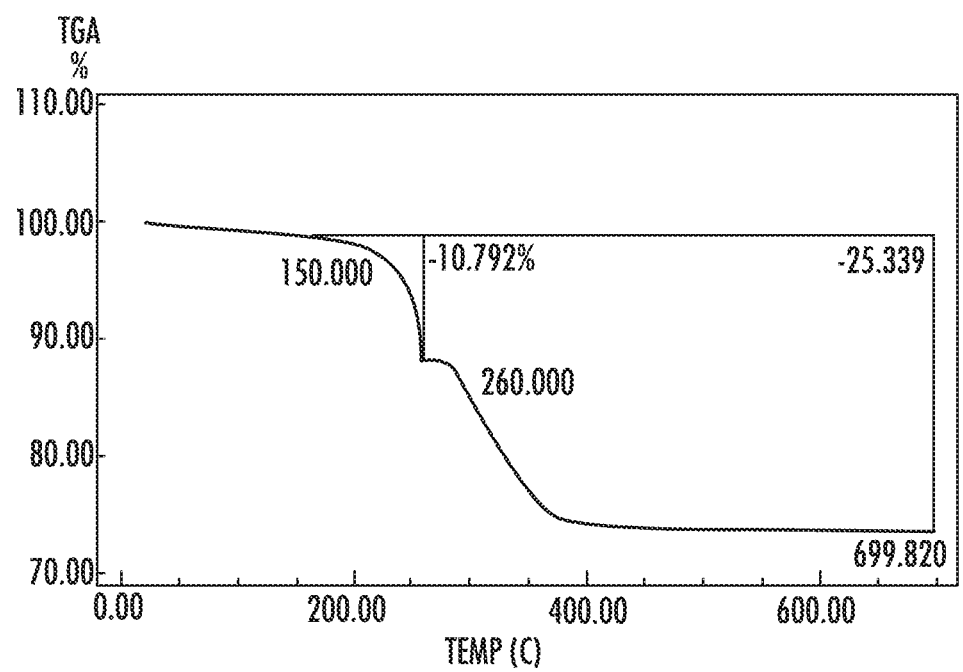
FIG. 5 shows a TGA [thermogravimetric] of sample USP#6 in a synthetic air atmosphere, at a heating rate of 10° C.min$^{-1}$ in the 25-700° C. range.

The thermogravimetric analysis curve in a synthetic air atmosphere of the sample USP#6 can be seen in FIG. 5. A gradative mass loss can be noticed until the temperature of 150° C., which can be ascribed to the exit of residual volatile solvents in the sample.

Between 150 and 700° C., a 25.4% mass loss can be noticed. Considering the oxidizing nature of the atmosphere which was used, and that the organic protecting cover on the nanoparticles is totally consumed, the residue left after calcination is hematite, $Fe_2O_3$. Magnetite transformation ($Fe_3O_4$, 232 g mol−1) into $Fe_2O_3$ (160 g mol−1) results in a 3.4% mass increase. Therefore, the corrected mass loss equals 28.8%.

TABLE 3

| Cod. | Reactor (L) | Precursor Mass (g) | Triethanolamine mass (g) | BDB [Biodiesel Blend] Mass (g) | Temp. (° C.) |
|---|---|---|---|---|---|
| USP#1 | 2 | 90.4 | 16.6 | 198.0 | 283 |
| USP#2 | 3 | 183.7 | 33.0 | 400.6 | 280 |
| USP#3 | 3 | 360.2 | 66.3 | 802.5 | 253 |
| USP#4 | 6 | 720.2 | 132.1 | 1600 | 250 |
| USP#5 | 6 | 723.0 | 132.1 | 1603 | 250 |
| USP#6 | 6 | 722.0 | 132.2 | 1610 | 250 |

| Cod. | Time (min) | Proportion molar Prec./triet. | Evaluation of product magnetization | Pred. (g) | DLS (nm) |
|---|---|---|---|---|---|
| USP#1 | 15 | 1.0 | Magnetic | — | — |
| USP#2 | 37 | 1.0 | Magnetic | 12.5 | 11.1 |
| USP#3 | 30 | 1.0 | Magnetic | 31.2 | 17.0 |
| USP#4 | 36 | 1.0 | Magnetic | 35.1 | 13.6 |
| USP#5 | 30 | 1.0 | Magnetic | 32.8 | 25.3 |
| USP#6 | 30 | 1.0 | Magnetic | 36.4 | 26.9 |

1.5) Pilot

As a function of the success of the pre-pilot tests and survey of reaction conditions and parameters, the development of the process was continued in the pilot scale in a reactor with a nominal capacity of 1000 l. The configuration of the reactor was adjusted to reproduce the conditions and parameters determined in the pre-pilot test aiming at transposing the reaction and process conditions to the pilot scale.

Therefore, the developed process can be subdivided into three steps: precursor preparation, thermal decomposition and purification of the magnetite nanoparticles.

1.5.1) Precursor Preparation

The precursor was prepared by using the process developed in the laboratory of the Instituto de Química—USP [Chemistry Institute of the University of São Paulo]. To the reactor full with 500 kg water and heated at 94° C., 50.0 kg of sodium stearate were added, and after cooldown at 65° C., 20.5 kg of the iron chloride solution were added (18.8% Fe content, 0.8 l min−1) under 50-60 rpm agitation. After that, the temperature of the reaction system was lowered to 32° C. and the filtration process began, by opening the valve at the bottom of the reactor and transferring the mixture to a filter made of 16 dishes with filter paper. A small load of 0.4 kg $cm^3$ of $N_2$ was applied in order to facilitate the suspension flow to the filter which was rapidly becoming saturated. At each filter saturation, the filtering system was taken apart for the precursor to be removed and the filter reassembled so the process could continue. Four filtering and filter disassembling processes were carried out. The orange solid matter (precursor $[Fe(est)_3]$), still humid, was set on metal trays and taken to dry in a heated chamber with incandescent bulbs, to assist in the drying process. However, even after one night, the solid matter had a paste consistency due to the great remaining amount of water.

The first step of the process of this invention, that is, the double replacement reaction for the preparation of the iron stearate precursor took place in accordance with what was expected. Iron content and the pH of the supernatant were measured before filtration began and found to be, respectively, 0.11% e 7.5, thus confirming the efficiency of the process.

1.5.2) Thermal Decomposition in BDB 206.6 kg of the precursor mixture and water, and 47 kg of toluene were added to the reactor and heated at 91° C. under slow agitation (50-60 rpm) until reflux. Water/toluene mixture was collected in a collection recipient coupled to the distillation system where the water phase was weighted and discarded, while the toluene was returned to the reactor. 144.5 l of water were removed and in the end, 41.1 l of toluene. Considering the water and toluene masses which were removed and the initial mass of the mixture (precursor+water) and added toluene, the amount of precursor was estimated to be of 68 kg.

At the end of this process the reactor was filled with 200 kg of biodiesel (Dhaytan OM—Dhaymers) and heated to 150° C.

During the process a great amount of foam was generated, and then it was necessary to increase agitation to 200 rpm and use a flow of $N_2$ to assist in removing the volatile residues still present in the precursor. In all, 24.5 kg of volatiles were collected during the heating up to 150° C., which reduces the initial estimated precursor amount from 68 to 43.5 kg.

Then 9 kg of triethanolamine were added and the mixture temperature was raised up to 220° C. and kept at that level for 30 minutes. After that, 2.12 more kilos of volatiles were removed.

1.5.3) Purification

After the thermal decomposition step, the system was cooled down at a temperature of 80° C., 140 kg ethanol and 10 kg Celite were added, and the resulting mixture was filtered.

The reactor and the filter were washed with 50 kg of ethanol and filtrate. Then the reactor was loaded with 100 kg toluene, heated at 87° C. and circulated by the filter, returning to the reactor with the nanoparticles redispersed in that solvent. Resulting dispersion was placed in 2 tanks of 50 kg each.

1.6) Pilot Test Assessment

Some tests were performed to generate a process which facilitates the separation of the solid product from the aqueous phase which contains undesirable impurities, preferably by decantation. The achieved development involves the following additional steps: 1) heating water to 85° C.; 2) adding and solubilizing sodium stearate under agitation; 3) slowly adding iron chloride solution through a dispenser; 4) quickly agitating for 15 minutes; 5) slowly adding toluene under agitation; temperature is lowered to 65° C.; 6) adding water for phase separation and purification; 7) adding toluene in order to promote aggregation of the precipitate and formation of azeotropic mixture to facilitate drying.

Additional steps described make it possible to prepare the solid precursor, purified and virtually dry, without the inconveniences described above, through a decantation and/or process which is much simpler. In addition to that, the reduction of the solvent volumes used in this new process makes it possible to prepare a greater amount of the precursor per batch.

1.7) Magnetic Nanofluid Preparation

A magnetic nanofluid sample was prepared by the dispersion of the nanomaterials obtained in the pre-pilot tests USP#3, USP#5 and USP#6. 100 g solid magnetite nanoparticles were dispersed in toluene in reflux, and hot filtered for the removal of eventual impurities, generating a magnetic fluid with approximately 20% (m/m) $Fe_3O_4$ nanoparticles.

1.8) Magnetic Nanofluid Partial Characterization

In accordance with the histograms of the particle measurements of the samples USP#3, USP#5 and USP#6, illustrated in FIG. 6, through DLS they are made up of monodispersions of $Fe_3O_4$ nanoparticles with average sizes of 17, 25 and 27 nm, respectively. The nanofluid sample was prepared by mixing the three products.

The high degree of homogeneity of the individual samples is one of the most important characteristics of these nanomaterials. Considering that in this size range, small changes in diameter might change significantly its magnetic properties, particularly the superparamagnetic properties.

Figure 7:
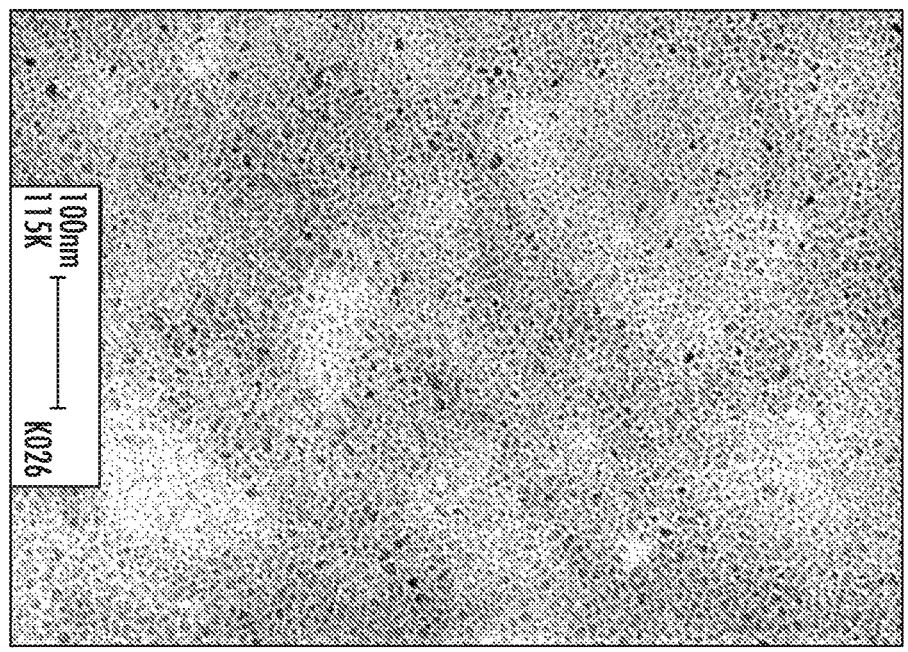
FIG. 7 shows a transmission electronic analysis of the nanoparticles in sample USP#6.
Figure 8:
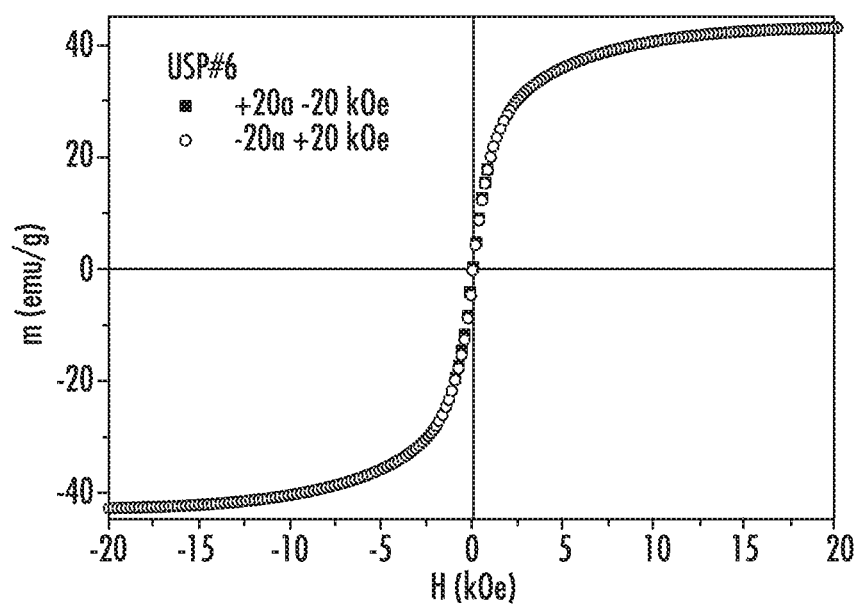
FIG. 8 shows a hysteresis curve for sample USP#6 at a scanning range of 20 to −20 kOe, at room temperature.

The average size of the nanoparticles in the samples is within the typical size range of magnetite nanoparticles presenting superparamagnetic properties. Therefore no change in this property is expected when mixing with fractions USP#3, USP#5 and USP#6. Besides, samples USP#5 and USP#6, which represent around 70% of the nanomaterial, present particles with very close average sizes, 25 and 27 nm (DLS) respectively, thus contributing for the greater part of the sample characteristics. The distribution size measurements obtained by MET (Microscopia Eletrônica de Transmissão [Transmission Electron Microscopy]) of sample USP#6 show particles with average sizes of 7.9±1.8 nm, as illustrated in FIG. 7. The result obtained by MET presents better correlation with the average size of the magnetic nucleus ($Fe_3O_4$) of the particle, and therefore is more adequate to make the correlations with the magnetic properties, such as the magnetic susceptibility measurements and the hysteresis curves, as shown in FIG. 8.

The magnetic behavior of sample USP#6 was evaluated by means of a vibrating sample magnetometer. The sample magnetic susceptibility curves were measured in a 20 KOe [Kilo oersteds] saturation field. The hysteresis curve of sample USP#6 in a magnetic field cyclic scan from +20 kOe to −20 kOe, returning to +20 kOe. A response profile can be observed which is typical of a superparamagnetic material, with saturation magnetization of 42 emu g−1 [mass magnetization unit] and absence of coercivity (<20 Oe, within experimental error).

Example 2) about the Use as Drilling Fluid Additive 2.1) Drilling Fluid Preparation
2.1.1) Compatibility with the Drilling Fluid Two paraffin-based fluids, one standard synthetic fluid and another standard synthetic fluid with 3% v/v of a dispersion of magnetic nanoparticles (that is, 0.3-0.6% m/vol of magnetite nanoparticles per fluid volume), were prepared and used for assessment of the magnetite nanoparticles as drilling fluid additives. Note that the only difference between the original synthetic fluid and the corresponding fluid with additive is the presence of magnetite nanoparticles.

2.1.2) Emulsion Stability (Drilling Fluid)

The evaluation of an emulsion stability is usually done by applying an electric current between two electrodes, and forcing the coalescence of the water droplets, thus make it possible to have an electric charge flow. Measurement of the electric stability gives an idea of the emulsion stability.

Theoretically, the greater the electric potential needed, the greater the emulsion stability will be. Field experience shows that the ongoing follow up of the electric stability is extremely useful, and the information about the emulsion has behaved along oil well drilling is very accurate. Although absolute values are questionable, the trend in the variation of those values shows at what level the emulsion is losing stability or not. The synthetic fluid with magnetite nanoparticles showed an electric stability value equal to 390 V, greater than the reference standard synthetic fluid which presents a value of 355 V. Therefore, it is possible to certify, for sure, that the property was not altered.

2.1.3) Sandstone Filtration

The assessment of the filtering properties of the drilling fluid is normally done through static filtration tests in porous media (sandstone, rock cores, filter paper, ceramics etc.). In this test, the fluid is placed on the porous medium and submitted to a constant pressure differential. The volume of fluid which permeates the porous medium is monitored along time. As the fluid is filtered a low-permeability filter cake is formed on the surface of the porous medium.

The experts in the field shall value the knowledge we are presenting here and can reproduce the invention in the modes presented and other variants, encompassed in the scope of the attached claims.

The invention claimed is:

1. A process for the production of nanoparticles, comprising the following steps:
   a) preparing a precursor from a reaction of at least one carboxylate with at least one transition metal ion, selected from the group consisting of Fe(III), Co(III), Mn(III), Cr(III), Ni(II), Cu(II) and Zn(II) in aqueous medium; and
   b) under reflux, adding to the precursor of the step a) a high boiling point oil phase having a boiling point of greater than 200° C., and at least one reducing agent, wherein a reflux temperature is between 180 and 310° C.
   wherein the molar ratio between the precursor and the reducing agent is between 0.5 and 1.5, and
   the reducing agent is triethanolamine.

2. The process according to claim 1, wherein the carboxylate is a saturated aliphatic carboxylate.

3. The process according to claim 1, wherein step a) comprises the following steps:
   a.i) heating the water used in the reaction medium to a temperature of from 70 to 100° C.;
   a.ii) adding carboxylate, under agitation;
   a.iii) adding the transition metal ion as an halide; and
   a.iv) adding toluene under agitation.

4. The process according to claim 1, wherein the molar ratio between the precursor and the reducing agent is between 1.0 and 1.5.

5. The process according to claim 1, wherein the oil phase comprises paraffin, octadecene, biodiesel from vegetable or animal oil, or yet mixtures of these substances.

6. The process according to claim 1, wherein the carboxylate is sodium stearate and the Fe (III) is added as iron chloride as transition metal.

7. The process according to claim 1, comprising a purification step which includes at least one ethanol flushing, at least one filtration and at least one extraction to toluene.

* * * * *